T. R. BROWN.
AUTOMATIC CAR AND PIPE COUPLING.
APPLICATION FILED APR. 14, 1914.
1,249,319.
Patented Dec. 11, 1917.
2 SHEETS—SHEET 1.
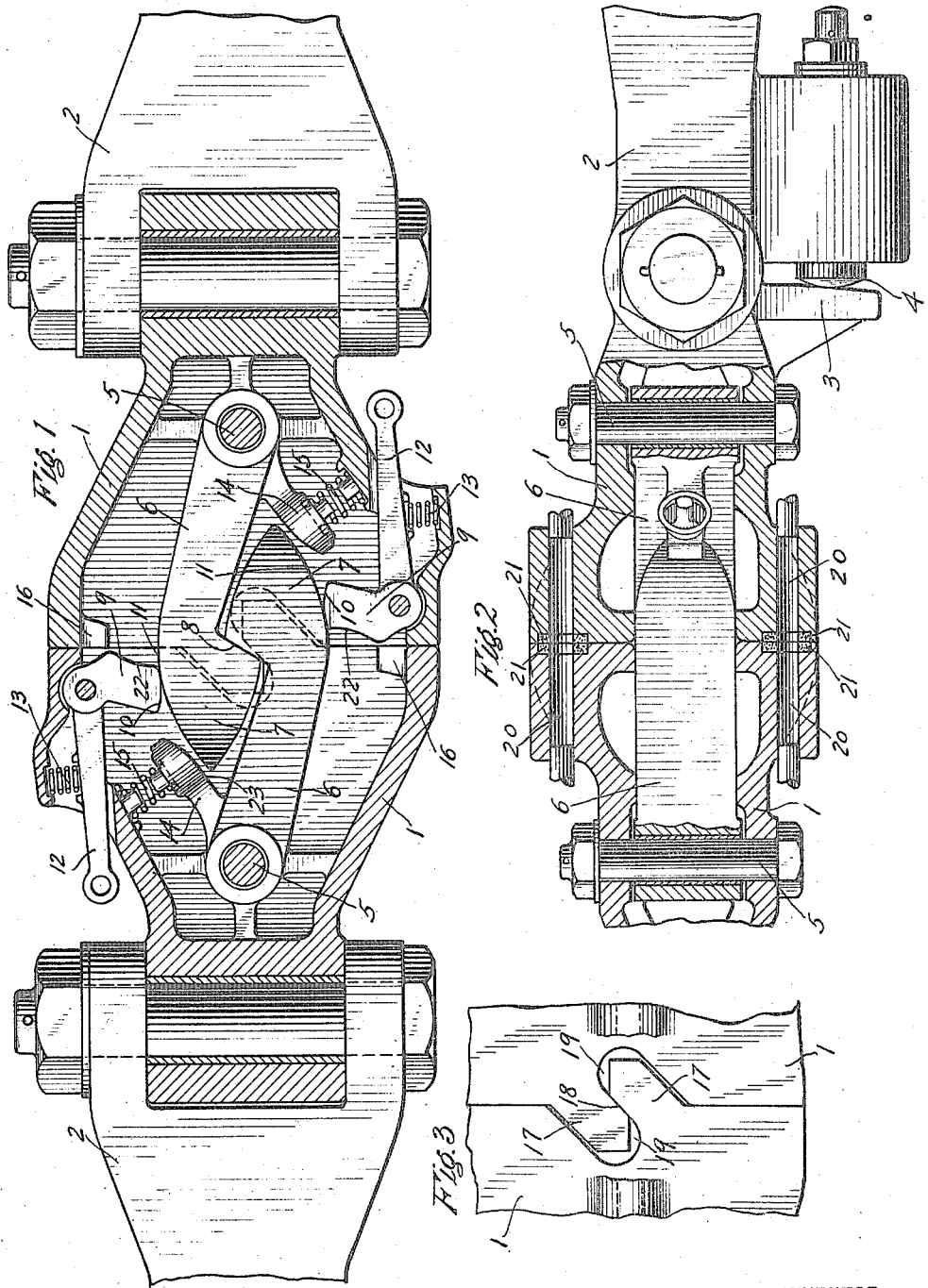

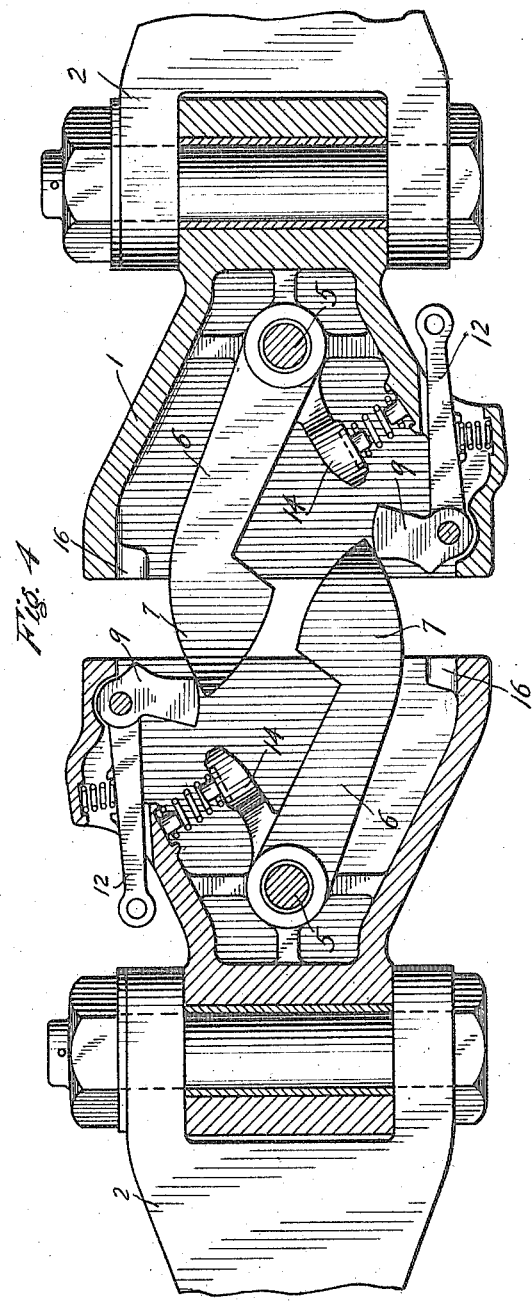

UNITED STATES PATENT OFFICE.

THOMAS R. BROWN, OF SPARKILL, NEW YORK, ASSIGNOR TO THE WESTINGHOUSE AIR BRAKE COMPANY, OF WILMERDING, PENNSYLVANIA, A CORPORATION OF PENNSYLVANIA.

AUTOMATIC CAR AND PIPE COUPLING.

1,249,319.

Specification of Letters Patent.  Patented Dec. 11, 1917.

Application filed April 14, 1914.  Serial No. 831,787.

*To all whom it may concern:*

Be it known that I, THOMAS R. BROWN, a citizen of the United States, residing at Sparkill, in the county of Rockland and State of New York, have invented new and useful Improvements in Automatic Car and Pipe Couplings, of which the following is a specification.

This invention relates to coupling devices, and more particularly to a coupler for automatically connecting vehicles in a train.

It has heretofore been purposed to employ an automatic car coupler in which hook shaped projections having vertical plane surfaces engage each other by a relative lateral movement, and are tightly held together by means of a movable lock, this coupler being known as the rigid tight lock type. Such a construction is set forth in Patent No. 708,747 of George Westinghouse, dated Sept. 9th, 1902.

With this form of rigid lock coupler, it is necessary that both of the locks of the two counterpart couplers should be released in order that the same may be separated and the cars pulled apart.

One object of my invention contemplates providing a tight lock car coupler in which counterpart couplers may be separated upon releasing only one of the locks.

Another object of my invention is to provide a tight lock coupler in which the hook shaped projection is movable.

Another object of my invention is to provide a tight lock coupler having a movable hook shaped projection and a rigid projection adapted to interlock with similar projections on a counterpart coupler, and a lock for tightly clamping together the movable projections of the counterpart couplers.

Various other objects and advantages will be apparent in the following more detailed description of my invention.

In the accompanying drawings, Figure 1 is a horizontal section of two counterpart couplers in the coupled position, and embodying my invention; Fig. 2 a vertical section thereof; Fig. 3 a fragmentary plan view, showing the rigid projections of two counterpart couplers interlocked; and Fig. 4 a horizontal section of two counterpart couplers in the act of coupling, showing a coupler embodying my invention where only the movable hook shaped projection is employed.

As shown in the drawings, the coupler may comprise a casing 1, pivotally connected to the draw bar 2, and having a depending arm 3 adapted to bear against the end of a spring pressed pin 4 mounted on the draw-bar 2 for yieldingly holding the coupler in a horizontal position.

The casing 1 has a meeting face adapted to engage the corresponding face of a counterpart coupler, and within the casing is pivotally mounted on a pin 5 an arm 6 having at its outer end a hook shaped projection 7.

The projection 7 has a vertical plane surface 8, preferably inclined, and adapted to engage a similar surface of the hook shaped projection in a counterpart coupler.

A movable locking lever 9 is pivoted within the casing and has a cam face 10 adapted to bear against a surface 11 on the outer side of the projection 7, the surface 11 being preferably extended to the extreme end of the projection to serve as a guiding means in the act of coupling. The locking lever 9 is provided with an arm 12 through which the lock may be released and a spring 13 acts on the arm 12 and tends to maintain the lock in engagement with the surface 11.

In order to assist in the disengagement of the projections 7 of counterpart couplers in uncoupling, the arm 6 carries a lug 14 against which a spring 15 acts to throw the arm 6 outwardly, the outward movement of the arm 6 being preferably limited by a stop 16 in the casing 1.

The horizontal faces of the arm 6, shown in Fig. 2, are preferably machined to engage corresponding machined surfaces in the casing, in order to maintain the arm 6 in horizontal alinement.

In the construction shown in Figs. 1, 2, and 3 of the drawings, rigid projections 17 are provided on opposite sides of the casing 1 having inclined vertical plane surfaces 18 adapted to engage corresponding surfaces on a counterpart coupler in coupled position, a recess 19 being provided in the face of the casing 1 for receiving projection 17.

One or more fluid pressure conduits 20 may be arranged in the casing 1 with openings containing gaskets 21 at the meeting face of the coupler.

The lateral horizontal faces of the projection 7 are tapered to the point of the projection to provide assistance in guiding the parts into proper alinement in the act of coupling.

When uncoupled, the arm 6 rests against the stop 16, being yieldingly held there by the spring 15. If it is desired to effect the coupling between counterpart couplers, upon bringing the same together, the outer extremity of the hook-shaped projection 7 first engages the surface 22 of the locking lever 9 in the counterpart coupling. This surface is preferably inclined so as to have a tendency to turn the arm 6 inwardly toward the longitudinal axis of the coupler and to some extent, dependent upon the relative forces acting, the locking lever may be turned rearwardly about its pivot, as the projection 7 moves forward, but as soon as the outer extremity of the projection passes below the surface 22, the locking lever 9 will swing back more or less to a position such as shown in Fig. 4 of the drawings.

As the meeting faces of the counterpart couplers further approach each other, the hook-shaped projections 7 are gradually brought together, with the vertical plane surfaces 8 of the projections in engagement, the face 23 of the lug 14 also serving to guide the projections during the final movement in the act of coupling and in the coupled position, the locks 9 move outward and engage the respective surfaces 11 of the counterpart projections and clamp the same tightly together.

In coupling up, the rigid projections 17 of the counterpart couplings are caused to interlock with the vertical plane surfaces 18 in engagement, as clearly shown in Fig. 3 of the drawings, and the couplers are tightly clamped together by the action of the locking levers 9, the cam faces 10 of which constantly tend to take up any lost motion, by engagement with the surface 11 of the hook shaped projections.

With the tight lock coupler as previously constructed, it is necessary to shift both of the locking levers of counterpart couplers to release position before the couplers can be separated. One of the important advantages of the present coupler is that couplers may be separated upon shifting either one of the locking levers of the counterpart couplers to release position. The above will be evident from the fact that in uncoupling, if one of the locking levers 9 is turned to release position, the pivoted lever 6 with its hooked-shaped projection 7 of the other coupler is free to swing laterally about its pivot pin 5 and thus become disengaged from the other hook-shaped projection 7 as the cars separate, the contacting surface 8 of the moving hook-shaped projection 7 sliding along the surface 8 of the stationary projection 7 of the other coupler.

The construction shown in Fig. 4 of the drawings is the same as that shown in Figs. 1, 2, and 3, except that the fixed hook-shaped projections 17 are not employed, and the operation is substantially the same except that the couplers can move to the coupled position without the lateral movement required where the fixed projections 17 are employed.

Having now described my invention, what I claim as new and desire to secure by Letters Patent is:—

1. A car coupler comprising a casing, an arm pivoted in said casing and provided with a hook-shaped projection adapted to interlock with a similar projection of a counterpart coupler, a locking lever also pivoted on said casing for clamping together the hook-shaped projections of counterpart couplers and adapted to serve as a guide for directing the projections into coupled position.

2. A car coupler comprising a casing, an arm pivoted in said casing and provided with a hook-shaped projection adapted to interlock with a similar projection of a counterpart coupler, a locking lever also pivoted on said casing for clamping together the hook-shaped projections of counterpart couplers and adapted to serve as a guide for directing the projections into coupled position, and means carried by said arm for also guiding the projections to the coupled position.

3. A car coupler comprising a casing, an arm pivoted in said casing and provided with a hook-shaped projection adapted to interlock with a similar projection of a counterpart coupler, a locking lever also pivoted on said casing for clamping together the hook-shaped projections of counterpart couplers and adapted to serve as a guide for directing the projections into coupled position, and a lug carried by said arm and provided with a guiding surface for directing the movement of the projections in the act of coupling.

4. In a car coupler, the combination with a coupler head having a rigid hook-shaped projection adapted to interlock by a relative lateral and longitudinal movement in the act of coupling with a similar projection on a counterpart coupler head, of an arm pivoted in said head and carrying a hook-shaped projection adapted to interlock with a similar projection of a counterpart coupler head, and means for clamping said pivoted arm in locked position.

In testimony whereof I have hereunto set my hand.

THOMAS R. BROWN.

Witness:
S. W. KEEFER.

Copies of this patent may be obtained for five cents each, by addressing the "Commissioner of Patents, Washington, D. C."